US009916343B2

(12) United States Patent
Lyle

(10) Patent No.: US 9,916,343 B2
(45) Date of Patent: Mar. 13, 2018

(54) EFFICIENT TRACKING OF AN ALTERNATE GLOBAL UPDATE AND READ VALUES USING EXCEPTION LISTS

(71) Applicant: International Business Machines Corporation, Armonk, NY (US)

(72) Inventor: Robert W. Lyle, Morgan Hill, CA (US)

(73) Assignee: International Business Machines Corporation, Armonk, NY (US)

(*) Notice: Subject to any disclaimer, the term of this patent is extended or adjusted under 35 U.S.C. 154(b) by 427 days.

(21) Appl. No.: 14/677,965

(22) Filed: Apr. 2, 2015

(65) Prior Publication Data

US 2016/0292156 A1 Oct. 6, 2016

(51) Int. Cl.
G06F 17/30 (2006.01)
G06F 9/50 (2006.01)

(52) U.S. Cl.
CPC ...... *G06F 17/30371* (2013.01); *G06F 9/5011* (2013.01); *G06F 17/3023* (2013.01); *G06F 17/30165* (2013.01)

(58) Field of Classification Search
None
See application file for complete search history.

(56) References Cited

U.S. PATENT DOCUMENTS

| 5,247,672 A | 9/1993 | Mohan |
| 5,495,601 A | 2/1996 | Narang et al. |
| 7,647,296 B2 | 1/2010 | Lyle et al. |
| 9,231,858 B1 * | 1/2016 | Greifeneder ............ H04L 45/24 |
| 2004/0236746 A1 * | 11/2004 | Lomet ............... G06F 17/30551 |
| 2006/0218206 A1 * | 9/2006 | Bourbonnais ..... G06F 17/30377 |
| 2007/0083500 A1 * | 4/2007 | Zibitsker ............... G06F 9/5083 |
| 2007/0219998 A1 * | 9/2007 | Lyle .................. G06F 17/30348 |

OTHER PUBLICATIONS

"Overhead", Computer Desktop Encyclopedia; The Computer Language Company; retrieved on Jul. 21, 2017 from: http://lookup.computerlanguage.com/host_app/search?cid=C999999&term=overhead&lookup.x=0&lookup.y=0.*
List of IBM Patents or Patent Applications Treated as Related.

* cited by examiner

*Primary Examiner* — Alex Gofman
*Assistant Examiner* — Umar Mian
(74) *Attorney, Agent, or Firm* — North Shore Patents, P.C.; Michele Liu Baillie

(57) ABSTRACT

Optimizing approximation of an earliest access time of objects in a datasharing environment by maintaining a global exception list for objects that are accessed by transactions that commit infrequently. The global exception list comprises a time value representing the earliest access time for each object in the global exception list, and an object identifier. The system references the global exception list to determine whether the object is in the global exception list. If the object is in the global exception list, the system uses the time value associated with the object when determining the earliest access time for the object. If not, the system approximates the earliest access time of the object by selecting the most recent access time value from the global exception list, providing more recent access times for objects accessed by transactions that commit frequently.

10 Claims, 8 Drawing Sheets

Member 1 CLSN Values

| OBID# | CLSN |
|---|---|
| 1 | 1135 |
| 3 | 540 |
| 4 | 1162 |
| 5 | 1053 |
| 9 | 250 |
| 12 | 1129 |
| 31 | 1172 |
| 37 | 1192 |
| 38 | 1151 |

System CLSN 250

Global CLSN 127

Member 2 CLSN Values

| OBID# | CLSN |
|---|---|
| 2 | 968 |
| 3 | 1117 |
| 4 | 1175 |
| 7 | 304 |
| 9 | 329 |
| 25 | 1196 |
| 29 | 127 |
| 31 | 1173 |
| 37 | 1184 |

System CLSN 127

FIG. 2

Member 1 CLSN Values

| OBID# | CLSN |
|---|---|
| 1 | ~~1135~~ |
| 3 | ~~540~~ |
| 4 | 1162 |
| 5 | ~~1053~~ |
| 9 | ~~250~~ |
| 12 | ~~1129~~ |
| 31 | 1172 |
| 37 | 1192 |
| 38 | 1151 |

System CLSN 250

Global CLSN 127

Member 2 CLSN Values

| OBID# | CLSN |
|---|---|
| 2 | ~~968~~ |
| 3 | ~~1117~~ |
| 4 | 1175 |
| 7 | ~~304~~ |
| 9 | ~~329~~ |
| 25 | 1196 |
| 29 | ~~127~~ |
| 31 | 1173 |
| 37 | 1184 |

System CLSN 127

FIG. 3

Member 1 CLSN Exception List

| OBID# | CLSN |
|---|---|
| 1 | 1135 |
| 3 | 540 |
| 5 | 1053 |
| 9 | 250 |
| 12 | 1129 |

Member 1 RLSN Exception List

| OBID# | RLSN |
|---|---|
| 3 | 537 |
| 5 | 1021 |
| 9 | 232 |
| 12 | 216 |
| 38 | 1102 |

Member 1
System CLSN 250
System RLSN 216

Member 1
Alt. System CLSN 1151
Alt. System RLSN 1103

Global CLSN 127
Global RLSN 125

Alt. Global CLSN 1151
Alt. Global RLSN 1103

FIG. 4

Member 2 CLSN Exception List

| OBID# | CLSN |
|---|---|
| 2 | 968 |
| 3 | 1117 |
| 7 | 304 |
| 9 | 329 |
| 29 | 127 |

Member 2 RLSN Exception List

| OBID# | RLSN |
|---|---|
| 2 | 955 |
| 3 | 1103 |
| 7 | 257 |
| 9 | 323 |
| 29 | 125 |

Member 2
System CLSN 127
System RLSN 125

Member 2
Alt. System CLSN 1173
Alt. System RLSN 1142

Global CLSN 127
Global RLSN 125

Alt. Global CLSN 1151
Alt. Global RLSN 1103

FIG. 5

Global CLSN Exception List

| OBID# | CLSN |
|---|---|
| 1 | 1135 |
| 2 | 968 |
| 3 | 540 |
| 5 | 1053 |
| 7 | 304 |
| 9 | 250 |
| 12 | 1129 |
| 29 | 127 |

Member 1
System CLSN 250
System RLSN 216

Member 1
Alt. System CLSN 1151
Alt. System RLSN 1103

Global CLSN 127
Global RLSN 125

Alt. Global CLSN 1151
Alt. Global RLSN 1103

Global RLSN Exception List

| OBID# | RLSN |
|---|---|
| 2 | 955 |
| 3 | 537 |
| 5 | 1021 |
| 7 | 257 |
| 9 | 232 |
| 12 | 216 |
| 29 | 125 |
| 38 | 1102 |

Member 2
System CLSN 127
System RLSN 125

Member 2
Alt. System CLSN 1173
Alt. System RLSN 1142

EFFICIENT TRACKING OF AN ALTERNATE GLOBAL UPDATE AND READ VALUES USING EXCEPTION LISTS

BACKGROUND

In database systems, many performance optimizations involve tracking the oldest times at which currently active read and write transactions first accessed an object within the database. In datasharing environments, the oldest update time and oldest read time within the entire system are commonly tracked by taking the oldest read and oldest write times of all currently active transactions in each system, and then taking the oldest value from each system to derive the oldest times of access across all datasharing members. The oldest update time and oldest read time may result being excessively 'stale' for the majority of active objects in the datasharing environment. For example, a single long running transaction within any member of the system can set the oldest update time and oldest read time to the time when that transaction first accessed any object, while the majority of objects' first access times are far more recent.

SUMMARY

According to one embodiment of the present invention, in a method for optimizing approximation of an earliest access time of objects in a datasharing environment, the method maintains a global exception list for the objects that are accessed by transactions that commit infrequently within the datasharing environment. The global exception list comprises at least one time value representing the earliest access time for each object that commits infrequently in the global exception list, and an object identifier associated with the object. The method references the global exception list to determine whether the object identifier associated with the object is in the global exception list. The global exception list is referenced to optimize usage of the datasharing environment's system resources. If the object identifier is in the global exception list, the method uses the time value associated with the object identifier to determine the earliest access time for the object associated with the object identifier. If the object identifier is not in the global exception list, the method approximates the earliest access time of the object by selecting the most recent access time value from the time values in the global exception list, where approximation of the earliest access time of the object is optimized by excluding less recent time values when selecting the most recent access time. This provides more recent access times for objects that commit frequently within the datasharing environment. The method makes the global exception list available to members of the datasharing environment.

System and computer program products corresponding to the above-summarized methods are also described and claimed herein.

BRIEF DESCRIPTION OF THE DRAWINGS

FIG. 2 illustrates an example embodiment where two members of a datasharing environment track earliest update access for each of the objects in that member.

FIG. 3 illustrates an example embodiment of identifying objects for member created exception lists based on CLSN values.

FIG. 4 illustrates an example embodiment of Member 1 created exception list.

FIG. 5 illustrates an example embodiment of Member 2 created exception list.

FIG. 6 illustrates an example global exception list compiled from two members of the datasharing environment.

DETAILED DESCRIPTION

Figure 1:
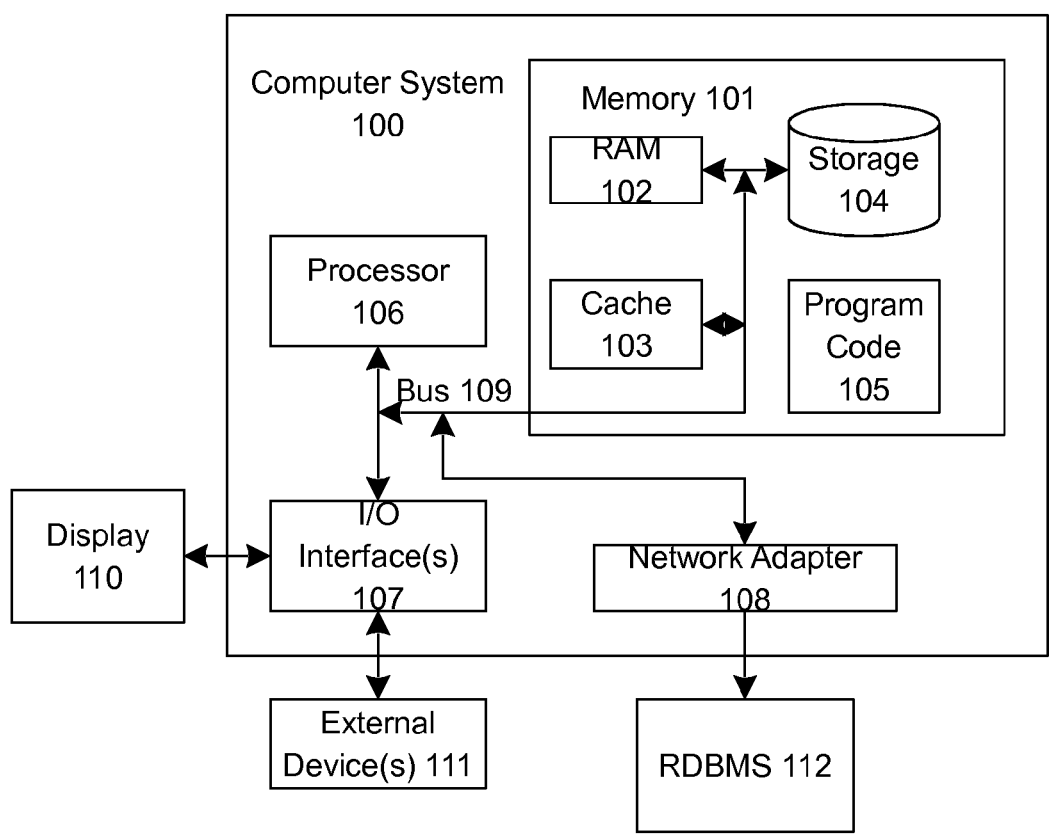
FIG. 1 illustrates an embodiment of a system for optimizing approximation of an earliest access time of objects in a datasharing environment, according to embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a system for optimizing approximation of an earliest access time of objects in a datasharing environment according to embodiments of the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more networks via network adapter 108. The computer system 100 may communicate with one or more databases 112 via network adapter 108.

FIG. 2 illustrates an example embodiment where two members of a datasharing environment track earliest update access for each of the objects in that member. Member 1 has a subset of objects currently being accessed. Those objects are 1, 3, 4, 5, 9, 12, 31, 37 and 38. Member 2 has a subset of objects, some of which are also in Member 1. The objects in Member 2 are 2, 3, 4, 7, 9, 25, 29, 31, and 37. The System Commit Log Sequence Number (CLSN) for Member 1 is 250. The System CLSN for Member 2 is 127. The Global CLSN for the datasharing environment is 127 (i.e., the minimum between 250 and 127). This is the earliest update access of all the objects in the datasharing system. In this example embodiment Member 1 and Member 2 each have only 9 objects, but systems typically have a very large number of objects being accessed. Members in the datasharing environment may also have different numbers of objects. In another example embodiment, the System Read Log Sequence Numbers (RLSN) for Member 1 and Member 2 may also be tracked.

FIG. 3 illustrates an example embodiment of identifying objects for member created exception lists based on CLSN values. In an example embodiment, each member in the datasharing environment identifies objects in that member that are that are accessed by transactions that commit infrequently. Member 1 and Member 2 create member created exception lists from objects that are updated by transactions that commit infrequently within that member. In Member 1, those objects are objects 1, 3, 5, 9, and 12 (shown with a line struck through the CLSN values in the Member 1 table). In Member 2, those objects are objects 2, 3, 7, 9, and 29 (shown with a line struck through the CLSN values in the Member 2 table). In this example, each member has identified five objects that are updated by transactions that commit infrequently, but any number of objects may be selected, and each member may select a different number of objects that are accessed by transactions that commit infrequently. Although in this example, CLSN values are tracked, RLSN values may also be tracked in a similar fashion.

FIG. 4 and FIG. 5 illustrate example embodiments of Member 1 and Member 2 created exception lists. Each member created exception list contains the objects that are accessed by transactions that commit infrequently. Member 1 and Member 2 each create a member created exception list from objects that are accessed by transactions that commit infrequently within that member. From the remaining objects, the respective most recent access times for the objects in Member 1 and Member 2 are chosen. In this example, the most recent CLSN (labeled as "Alt. System CLSN") for Member 1 is 1151, and for Member 2 is 1173. The minimum of 1151 and 1173 is chosen and labeled as "Alt. Global CLSN". Also in this example, the most recent RLSN (labeled as "Alt. System RLSN") for Member 1 is 1103, and for Member 2 is 1142. The minimum of 1103 and 1142 is chosen and labeled as "Alt. Global RLSN". In this example embodiment, the "Alt. Global CLSN" and "Alt. System RLSN" are the time values that will be used when determining the earliest access time for those objects not on the global exception list. In another example embodiment, the most recent access time in the global exception list will be used as the earliest access time. In yet another example embodiment, if any of the objects in the CLSN global exception list (or, respectively, the RLSN global exception list), has a value more current than the alternate global CLSN value, the alternate global CLSN value may be used for that object (and the object may be dropped from the CLSN global exception list). In this example, only two members are shown, but this example may be extrapolated for larger systems with many members, and many objects.

FIG. 6 illustrates an example global exception list compiled from two members of the datasharing environment. The global exception list is compiled from the member created exception lists. The global exception list is created from the "oldest" values in the member created global exception list. In this example, a Global CLSN Exception List and a Global RLSN Exception List are shown containing objects 1, 3, 5, 7, 9, 12, 29, and 38. In an example embodiment, some or all of the objects in the Global CLSN Exception List might be different than those objects in the Global RLSN Exception List, or the objects may be the same in both the Global CLSN Exception List and the Global RLSN Exception List.

Figure 7:
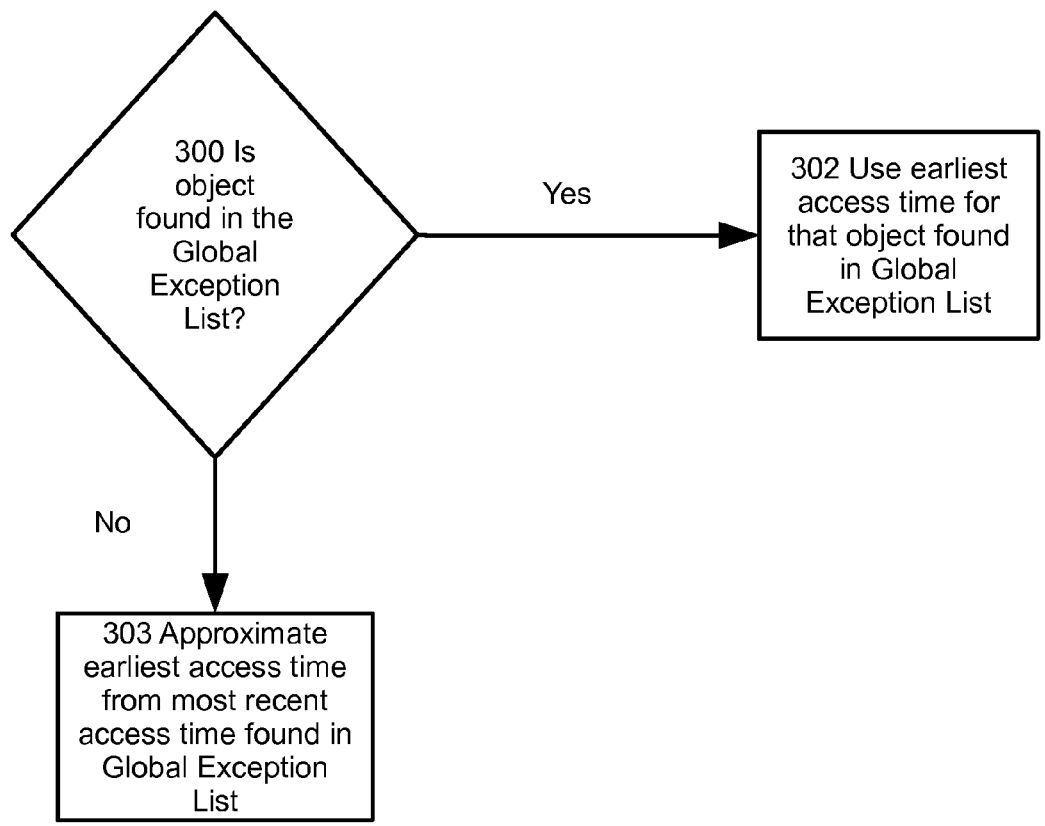
FIG. 7 is an example flowchart illustrating how the global exception list is accessed.

FIG. 7 is an example flowchart illustrating how the global exception list is accessed. At 300, the method accesses the global exception list to determine if the object is listed on the global exception list. If the object is found in the global exception list, at 302, the method uses, as the earliest access time for that object, the access time associated with that object in the global exception list. If the object is not found on the global exception list, at 303, the method approximates the earliest access time by using the most recent access time (of all the access times) found in the global exception list.

Figure 8:
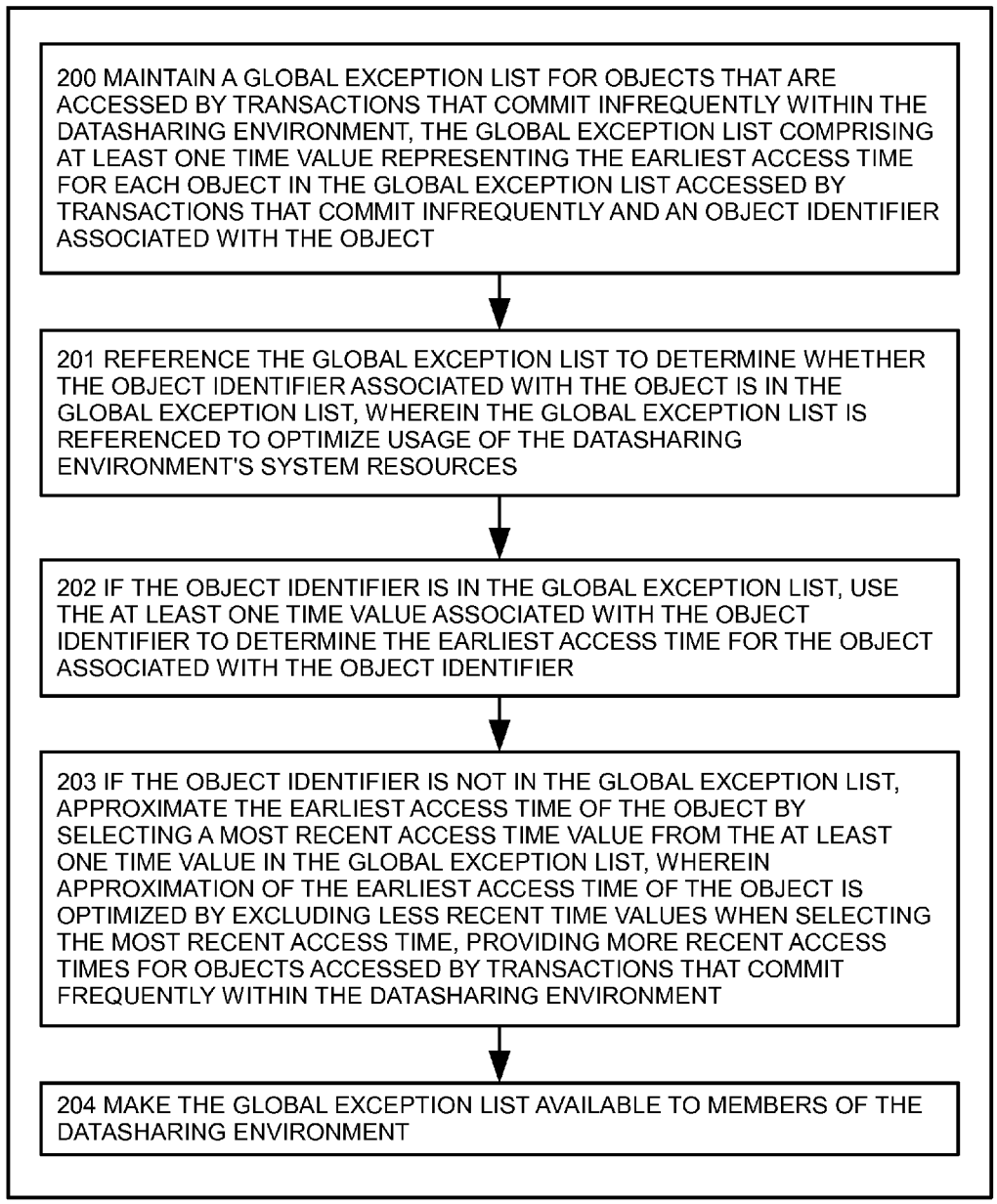
FIG. 8 is a flowchart illustrating an embodiment of a method for optimizing approximation of an earliest access time of objects in a datasharing environment, according to embodiments disclosed herein.

FIG. 8 illustrates an embodiment of a method for optimizing approximation of an earliest access time of objects in a datasharing environment. At 200, the method, via the computing processor 106, maintains a global exception list for objects that are accessed by transactions that commit infrequently within the datasharing environment. In this example embodiment, a datasharing environment is referenced, but any environment where a single system or multiple subsystems access the same object may also apply. The global exception list comprises at least one time value representing the earliest access time for each object in the global exception list that commits infrequently, and an object identifier associated with the object. The datasharing environment provides the earliest access time of an object. In a datasharing environment, the system keeps track of the oldest update time of a currently active transaction, and the oldest read time of a currently active transaction.

The system may use these values to determine for example, whether to acquire a lock, or whether to reclaim the space for an object. The majority of transactions commit frequently. A long running transaction, however, may set the oldest update time and/or the oldest read time far earlier than most of the other currently running transactions that commit far more frequently. To balance a few long running transactions against the majority of transactions that commit frequently, the method maintains a global exception list of those transactions that commit infrequently to separate out those transactions from the transactions that commit frequently. The difference between transactions that commit frequently and transactions that commit infrequently is dependent upon workloads and how the data is being accessed. In a datasharing environment, there may be many transactions (i.e., read and write transactions) running concurrently. If a currently active transaction is old enough that it begins degrading the performance of other transactions against other objects in the system, then it is beneficial to the datasharing environment to add the objects that the transaction is accessing to the global exception list, so that the transaction no longer impacts the performance of the transactions against other objects. This approach provides the benefits of providing a more recent access time for each object with lower tracking expenses. A datasharing environment may have thousands of objects, only a small number of which would be considered to be "stale". Maintaining a small (relative to the number of total objects) list of objects that are committing infrequently, that can be searched quickly, provides the datasharing environment with an efficient method of balancing the long running transactions with the transactions that commit frequently. In an example embodiment, if the number of objects in the global exception list is large, optimizations such as hashed lookups or hash filters may be used to reduce the overhead of examining the exception lists.

At 201, the method references the global exception list to determine whether an object identifier associated with an object is in the global exception list. The global exception list is referenced to optimize usage of the datasharing environment's system resources. The system resources may include acquiring locks, reclaiming space, etc. Acquiring and releasing locks require high system overhead, and lock avoidance techniques are often used. Referencing the global exception list to determine whether a more recent last access time may be used for a particular object enables the system to avoid unnecessary locks.

At 202, if the object identifier is in the global exception list, the method uses at least one time value associated with the object identifier to determine the earliest access time for the object associated with the object identifier. If the object is on the exception list, the method uses, for example, the update time and/or read time associated with that object when determining the earliest access time for that object. In other words, if the object is determined to be a "stale" object (i.e., tracked on the global exception list), the method uses the earliest access time associated with that object obtained from the global exception list.

At 203, if the object identifier is not in the global exception list, the method approximates the earliest access time of the object by selecting the most recent access time value from the global exception list, where the approximation of the earliest access time of the object is optimized by excluding less recent time values when selecting the most recent access time. This provides more recent access times for objects that are accessed by transactions that commit frequently within the datasharing environment. In an example embodiment, the method maintains a list of objects that are accessed by transactions that commit infrequently. The method determines that the earliest update time (for an object not tracked on the global exception list) is the most recent of those update times listed in the global exception list. In other words, if an object is not listed in the global exception list (i.e., not considered to be in the group of "stale" objects), the method approximates the earliest update time for that object by taking the most recent of update times listed in the global exception list. This approximated earliest update time is closer to the actual earliest update time for that object than if the method were to use the earliest update time for all the objects in the system.

At 204, the method makes the global exception list available to members of the datasharing environment. In an example embodiment, the global exception list is maintained in a global structure that is accessible by all members. The global exception list may have serialization to ensure that reads and writes to it are consistent. In another example embodiment, the method may retrieve the current global exception list and store it in a member's memory.

In an example embodiment, when the method maintains the global exception list for the objects that are accessed by transactions that commit infrequently within the datasharing environment, the method creates the global exception list from exception lists created by members of the datasharing environment. In an example embodiment, one or more members create individual member created exception lists from objects that are accessed by transactions that commit infrequently within each respective member. If the same objects occur in multiple member created exception lists, the oldest of those values is used in the global exception list. In FIG. 4, object 9 in the Member 1 CLSN exception list is 250, while in FIG. 5, object 9 in the Member 2 CLSN exception list is 329. The CLSN value of 250 is chosen as the earliest access time for object 9 in the global exception list.

In an example embodiment, when the method maintains the global exception list for the objects that are accessed by transactions that commit infrequently within the datasharing environment, the method reads at least one member created exception list at periodic intervals. The member created exception list is compiled, by a member, from objects that are accessed by transactions that commit infrequently within that member. In an example embodiment, at least some of the members create their exception lists at periodic intervals based on a timer. The frequency of member created exception lists (and which members produce an updated exception list) may be tuned to balance system overhead and currency of the access times in the member created exception lists. As noted above, the global exception list may be maintained in a global structure that is accessible by all members. The method may determine that a global exception list does not exist, or the global exception list that exists is too old. The method then reads at least one member created exception list into the global structure. The method may read the member created exception list at periodic intervals. In another example embodiment, the frequency of updating the global exception list may be tuned to optimize earliest access times and/or overhead of the datasharing environment. The method may also create the global exception list from the earliest access times (i.e., the "oldest values") in one or more of the member created exception lists. In other words, the earliest access times in the member created exception lists may be sorted to determine the objects that are accessed by transactions that commit infrequently within the datasharing environment. The method may also tune the number of objects in the global exception list to optimize approximation of the earliest access time of objects not tracked on the global exception list. In other words, the number of objects in the global exception list can be adjusted to ensure that the most recent of the earliest access times in the global exception list provide relatively recent access times for those objects not tracked on the global exception list (i.e., those objects that are accessed by transactions that commit frequently).

When the method maintains the global exception list for the objects that are accessed by transactions that commit infrequently within the datasharing environment, the method determines that the time value is comprised of at least one of an oldest update time of a currently active transaction, and an oldest read time of a currently active transaction. In an example embodiment, as illustrated in FIGS. 2 through 6, the oldest update time may be the system provided Commit Log Sequence Number (CLSN), and the oldest read time may be the system provided Read Log Sequence Number (RLSN). In a datasharing environment, each member may track CLSN and RLSN for each object.

In an example embodiment, when the method references the global exception list to determine whether the object identifier associated with the object is listed in the global exception list, the method optimizes lock avoidance by referencing the global exception list. The global exception list is referenced to determine whether a more recent access time may be used for the object than the earliest access time provided by the datasharing environment. The earliest access time is associated with a stale (i.e., long running) object. Using the more recent access time may allow the system to avoid an otherwise unnecessary lock.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for optimizing access to resources for objects in a datasharing environment, the datasharing environment comprising a plurality of members, the computer program product comprising:
    a computer readable storage medium having computer readable program code embodied therewith, the program code executable by at least one computing processor to:
    create a plurality of exception lists by the plurality of members, each of the plurality of exception lists comprising a plurality of objects accessed by currently active transactions that run longer than other transactions running against other objects such that the currently active transactions degrade performances of the other transactions, each of the plurality of objects being associated with an object identifier and an earliest access time value;

create a global exception list by merging the plurality of exception lists from the plurality of members;

in response to a request for a lock for a given object associated with a given object identifier, reference the global exception list to determine whether the given object identifier is in the global exception list;

if the given object identifier is in the global exception list, determine a given earliest access time associated with the given object identifier and use the given earliest access time to determine whether to grant the request for the lock to optimize an acquiring and releasing of locks between the currently active transactions and the other transactions;

if the given object identifier is not in the global exception list, select a most recent access time value from the global exception list and use the most recent access time value to determine whether to grant the request for the lock to optimize the acquiring and releasing of locks between the currently active transactions and the other transactions.

2. The computer program product of claim 1 further configured to:
make the global exception list available to the plurality of members of the datasharing environment.

3. The computer program product of claim 1 wherein the computer readable program code configured to create the global exception list by merging the plurality of exception lists from the plurality of members is further configured to:
read the plurality of exception lists created by the plurality of members at periodic intervals.

4. The computer program product of claim 3 further configured to:
tune the periodic intervals to optimize at least one of:
i) overhead of the datasharing environment; and
ii) currency of the global exception list.

5. The computer program product of claim 3 further configured to:
create the global exception list from oldest values in the plurality of exception lists created by the plurality of members.

6. The computer program product of claim 5 further configured to:
tune a number of objects in the global exception list to optimize approximation of the given earliest access time.

7. A system comprising:
a computing processor; and
a computer readable storage medium operationally coupled to the processor, the computer readable storage medium having computer readable program code embodied therewith to be executed by the computing processor, the computer readable program code configured to:
create a plurality of exception lists by a plurality of members in a datasharing environment, each of the plurality of exception lists comprising a plurality of objects accessed by currently active transactions that run longer than other transactions running against other objects such that the currently active transactions degrade performances of the other transactions, each of the plurality of objects being associated with an object identifier and an earliest access time value;
create a global exception list by merging the plurality of exception lists from the plurality of members;
in response to a request for a lock for a given object associated with a given object identifier, reference the global exception list to determine whether the given object identifier is in the global exception list;
if the given object identifier is in the global exception list, determine a given earliest access time associated with the given object identifier and use the given earliest access time to determine whether to grant the request for the lock to optimize an acquiring and releasing of locks between the currently active transactions and the other transactions; and
if the given object identifier is not in the global exception list, select a most recent access time value from the global exception list and use the most recent access time value to determine whether to grant the request for the lock to optimize an acquiring and releasing of locks between the currently active transactions and the other transactions.

8. The system of claim 7 further configured to:
make the global exception list available to the plurality of members of the datasharing environment.

9. The system of claim 7 wherein the computer readable program code configured to create the global exception list by merging the plurality of exception lists from the plurality of members is further configured to:
read the plurality of exception lists created by the plurality of members at periodic intervals.

10. The system of claim 9 further configured to:
tune the periodic intervals to optimize at least one of:
i) overhead of the datasharing environment; and
ii) currency of the global exception list.

* * * * *